United States Patent
Mayr et al.

(10) Patent No.: US 10,612,598 B2
(45) Date of Patent: Apr. 7, 2020

(54) ROLLING BEARING AND HOUSING FOR A TRANSMISSION

(71) Applicant: Schaeffler Technologies AG & Co. KG, Herzogenaurach (DE)

(72) Inventors: Christian Mayr, Eggolsheim (DE); Andre Anger, Uehlfeld (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/307,564

(22) PCT Filed: Mar. 21, 2017

(86) PCT No.: PCT/DE2017/100220
§ 371 (c)(1),
(2) Date: Dec. 6, 2018

(87) PCT Pub. No.: WO2018/001405
PCT Pub. Date: Jan. 4, 2018

(65) Prior Publication Data
US 2019/0301535 A1    Oct. 3, 2019

(30) Foreign Application Priority Data
Jun. 29, 2016  (DE) .......................... 10 2016 211 741

(51) Int. Cl.
*F16C 35/077* (2006.01)
*F16C 19/06* (2006.01)

(52) U.S. Cl.
CPC ............ *F16C 35/077* (2013.01); *F16C 19/06* (2013.01); *F16C 2226/74* (2013.01); *F16C 2361/65* (2013.01)

(58) Field of Classification Search
CPC ..... F16C 35/077; F16C 19/06; F16C 2226/74; F16C 2361/65
See application file for complete search history.

(56) References Cited

U.S. PATENT DOCUMENTS 4,710,037 A * 12/1987 Newberg ................ B25B 27/02
29/229
4,981,373 A *  1/1991 Bando ..................... F16C 19/30
384/620
(Continued)

FOREIGN PATENT DOCUMENTS

DE    2146749 A1    3/1973
DE    3338507 A1   11/1984
(Continued)

OTHER PUBLICATIONS

Machine Translation of DE 19860345.*
Machine Translation of JP 2003161327.*

*Primary Examiner* — Thomas R Hannon
(74) *Attorney, Agent, or Firm* — Reid A. Baldwin (57) ABSTRACT

Rolling bearings and housings for the same are disclosed. The rolling bearing may include an inner ring having a first raceway, an outer ring having a second raceway, having two end faces and an outer lateral surface, and comprising a plurality of rolling bodies. The outer lateral surface of the outer ring may be surrounded by a sleeve, which has at least one lug, pointing away from the outer ring and a first end face of the two end faces, for forming the axial position retention of the rolling bearing in an installed position.

9 Claims, 5 Drawing Sheets (56) References Cited

U.S. PATENT DOCUMENTS

| | | | |
|---|---|---|---|
| 5,927,867 A | 7/1999 | Niebling et al. | |
| 7,927,020 B2* | 4/2011 | Faust | F16C 27/04 |
| | | | 384/535 |
| 7,927,021 B2* | 4/2011 | Schumacher | F16C 35/067 |
| | | | 384/537 |
| 9,610,801 B2* | 4/2017 | Ravenna | B60B 27/0005 |
| 2003/0099419 A1* | 5/2003 | Vignotto | F16C 33/78 |
| | | | 384/539 |

FOREIGN PATENT DOCUMENTS

| | | |
|---|---|---|
| DE | 3719795 A1 | 12/1988 |
| DE | 3901283 A1 | 8/1989 |
| DE | 4006197 A1 | 8/1990 |
| DE | 4231272 A1 | 3/1994 |
| DE | 19646338 A1 | 5/1998 |
| DE | 19713333 A1 | 10/1998 |
| DE | 19860345 A1 | 7/2000 |
| DE | 10225878 A1 | 4/2003 |
| DE | 10307842 A1 | 9/2003 |
| DE | 10347361 A1 | 5/2005 |
| DE | 102012223222 A1 | 6/2014 |
| DE | 102013216796 A1 | 2/2015 |
| EP | 1270974 A2 | 1/2003 |
| FR | 2729442 A1 | 7/1996 |
| GB | 2004956 A | 4/1979 |
| JP | 2003161327 A | 6/2003 |

* cited by examiner

ROLLING BEARING AND HOUSING FOR A TRANSMISSION

CROSS-REFERENCE TO RELATED APPLICATIONS

This application is the U.S. National Phase of PCT Appln. No. PCT/DE2017/100220 filed Mar. 21, 2017, which claims priority to DE 10 2016 211 741.6 filed Jun. 29, 2016, the entire disclosures of which are incorporated by reference herein.

TECHNICAL FIELD

The disclosure relates to a rolling bearing, comprising an inner ring having a first raceway, comprising an outer ring having a second raceway, having two end faces and an outer lateral surface, and comprising a plurality of rolling bodies. The disclosure furthermore relates to a housing for a transmission comprising at least one rolling bearing of this type.

BACKGROUND

Rolling bearings of the type mentioned at the outset and the use thereof in housings of transmissions are already known. In this regard, DE 10 2013 216 796 A1 discloses a transmission device having gears, having at least one shaft and having at least one rolling bearing for mounting the shaft in a housing of the transmission device. The rolling bearing is seated with an inner bearing ring on the shaft and with an outer bearing ring in the housing, wherein at least one row of rolling bodies is arranged between the inner bearing ring and the outer bearing ring so as to be in contact with the inner bearing ring and the outer bearing ring. At least one disk spring is provided, which preloads the rolling bearing with respect to the housing. In this case, screwed against the housing is a plate against which the disk spring is supported on the one hand whilst on the other hand being supported against adjacent end faces of the inner ring and the outer ring of the rolling bearing.

A ball bearing is known from DE 42 31 272 A1, which has two outer bearing rings and an inner ring. The two outer bearing rings are arranged in a sleeve and are pressed against a shoulder of the sleeve by a tensioning ring. Axial positioning of the ball bearing in a steering box is enabled by a latching mechanism in that the sleeve has two latching tongues which spring radially outwards from its outer lateral surface.

DE 39 01 283 A1 describes a bearing sleeve comprising a hollow cylindrical first part and a plate-shaped second part integrally formed frontally thereon for supporting a component, wherein the first part has tongues which extend in the axial direction and have a flared tongue end. In this case, adjacent tongues are arranged in such a way that their tongue ends point in opposite directions.

SUMMARY

It is one object of the disclosure to provide an economically producible and easily assembled rolling bearing and a housing of a transmission having a rolling bearing of this type.

The object may be achieved for the rolling bearing in that is designed comprising an inner ring having a first raceway, comprising an outer ring having a second raceway, having two end faces and an outer lateral surface, and comprising a plurality of rolling bodies, wherein the outer lateral surface of the outer ring is surrounded by a sleeve, which has at least one lug, pointing away from the outer ring and a first end face of the two end faces of the outer ring, for forming the axial position retention of the rolling bearing in an installed position.

In this case, the at least one lug enables axial position retention at least in one axial direction, wherein the rolling bearing according to the disclosure is particularly easy and favorable to produce and quick to assemble. In this case, each lug is preferably aligned at an angle of up to 45°, in particular in the range of 1° to 30°, with respect to an axis of rotation of the rolling bearing.

The sleeve is, in particular, a deep-drawn sleeve, preferably with a small wall thickness in the range of 0.2 mm to 3.0 mm, in particular in the range of 0.5 mm to 1.5 mm. Furthermore, the sleeve is preferably formed from a metal material, in particular from steel. In this case, the production of the sleeve preferably involves a non-cutting process, although a cutting manufacturing process is also possible. To improve the elasticity and thereby the spring effect of a lug, the sleeve can be case-hardened or through-hardened depending on the metal material used. However, an embodiment which does not involve heat treatment is also conceivable. Alternatively, the sleeve can also be formed from plastics material or a composite material, comprising for example plastics material and metal or comprising plastics material and a fibrous material made from glass or carbon.

The rolling bearing is preferably pressed into the sleeve. The force for pressing the rolling bearing out of the sleeve, which is determined by the coverage between the rolling bearing and the sleeve, must be greater than the maximum axial bearing load occurring during use. Alternatively, the outer ring can be held axially in the sleeve by a rim on the sleeve and/or one or more embossments in the edge region of the sleeve and/or by a flange rim. In this case, it has proven effective to provide a transition fit or clearance fit between the outer ring and the sleeve. With regard to a radial operating clearance and an axial retention force, however, the provision of a press fit is preferable.

A cage for guiding the rolling bodies is preferably furthermore present. In particular, the cage for a rolling bearing in the form of a ball bearing is formed from plastics half shells which are connected to one another between two spherical rolling bodies. However, cages made from metal can also be used. Alternatively, full-type rolling bearings without a cage can also be realized.

Furthermore, at least one seal arrangement is preferably present, which is arranged in a region between the inner ring and the outer ring. The at least one seal arrangement shields the cage and the rolling bodies from the environment and protects them from dirt and other contamination. In this case, gap seals and/or contact seals can be used. However, the rolling bearing can also be formed without a seal arrangement.

It has proven effective if at least three, preferably four, lugs are present on the sleeve. Provided these are arranged in a uniform distribution over the circumference of the sleeve, optimum axial position retention of the rolling bearing can be achieved.

It has proven advantageous if the sleeve furthermore has at least one further lug, pointing away from the outer ring and from a second end face opposite the first end face, for forming the axial position retention of the rolling bearing in an installed position. In this case, the at least one further lug, in combination with the at least one lug, enables axial position retention in both axial directions.

The sleeve preferably does not project over at least one of the two end faces of the outer ring. However, it is also possible that the sleeve projects over neither end face. In this case, the outer ring is preferably connected to the sleeve via a press fit. Small installation depths for the rolling bearing according to the disclosure can thus also be realized.

However, it is equally possible that the outer lateral surface and, furthermore, the first end face and/or the second end face of the outer ring are surrounded by the sleeve. In particular, the outer ring is also connected to the sleeve via a press fit here.

It has furthermore proven effective if the sleeve has a rim and the outer ring is pressed or inserted into the sleeve up to the rim functioning as a stop.

In combination with this, that end of the sleeve which is opposite the rim can project partially over the outer ring, wherein the end of the sleeve is provided with at least one locally arranged embossment in the direction of the outer ring so that the outer ring is delimited by the sleeve at both end faces. This enables reliable holding of the outer ring in the sleeve, even when a press fit between the sleeve and the outer ring is not present.

In an alternative combination to the rim on the sleeve, the opposite end of the sleeve can project over the outer ring, wherein the protruding sleeve part is flanged in the direction of the outer ring so that the outer ring is delimited by the sleeve at both end faces. This also enables reliable holding of the outer ring in the sleeve, even when a press fit between the sleeve and the outer ring is not present.

The rolling bearing according to the disclosure can be a ball bearing, in particular a grooved ball bearing, a four-point contact ball bearing or an angular ball bearing. It relates in particular to a single-row ball bearing. However, multi-row ball bearings can also be analogously realized. The rolling bearing according to the disclosure can furthermore be a needle bearing.

The disclosure is achieved for the housing of a transmission, comprising at least one housing opening for receiving at least one rolling bearing according to the disclosure, in that at least one retaining contour is provided in the housing opening, by means of which the at least one lug is latched in the housing opening in the installed position of the rolling bearing, wherein axial position retention of the rolling bearing in the housing is provided.

In this case, the at least one lug enables axial position retention at least in one axial direction in the housing.

In one embodiment of the housing, the at least one housing opening has an end stop for the rolling bearing, up to which the rolling bearing can be inserted into the housing opening. The at least one lug and the end stop enable axial position retention of the rolling bearing in both axial directions of the housing.

Alternatively, the housing opening does not have an end stop for the rolling bearing. In such a case, at least one further retaining contour is preferably provided in the housing opening, by means of which the at least one further lug is latched in the housing opening in the installed position of the rolling bearing, wherein axial position retention of the rolling bearing in the housing is provided. In this case, the at least one further lug, in combination with the at least one lug, enables axial position retention in both axial directions of the housing.

In a further, particularly preferred configuration of the housing, only a single retaining contour is present, which combines the at least one retaining contour and the at least one further retaining contour and in which both the at least one lug and the at least one further lug are latched.

An advantage of this embodiment is not only the elimination of an axial securing element, but also the enhancement of the axial retention in housings when the material pairs have different coefficients of thermal expansion, e.g. in the case of an outer ring made from steel combined with a housing made from aluminum. Since the maximum coverage in the case of such material pairs is limited by the maximum admissible tension in the aluminum housing at low temperatures, it is still possible to ensure axial retention at high temperatures by means of the lugs.

A transmission having a housing according to the disclosure, in particular in the form of a transmission for a brake booster, has proven effective.

BRIEF DESCRIPTION OF THE DRAWINGS

FIGS. 1 to 11 show, by way of example, exemplary embodiments of the rolling bearing according to the disclosure and a housing having such a rolling bearing. The drawings show:

DETAILED DESCRIPTION

Figure 1:
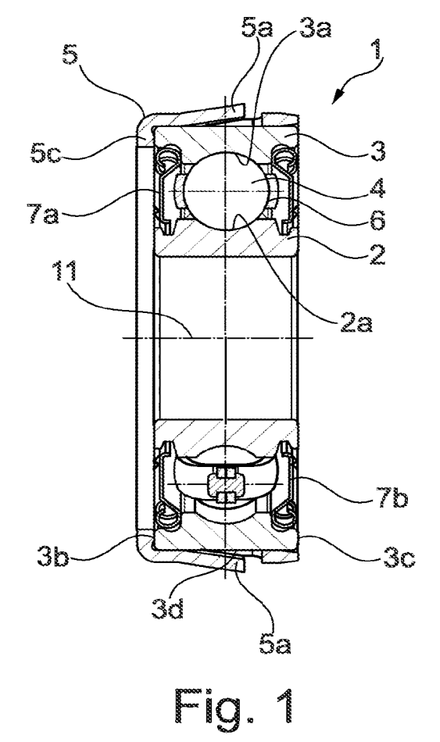
FIG. 1 a longitudinal section through a first rolling bearing according to the disclosure.

FIG. 1 shows a longitudinal section through a first rolling bearing 1 according to the disclosure in the form of a ball bearing. The first rolling bearing 1 comprises an inner ring 2 having a groove-shaped first raceway 2a and furthermore an outer ring 3 having a groove-shaped second raceway 3a, having two end faces 3b and 3c and an outer lateral surface 3d. The first rolling bearing 1 furthermore comprises a plurality of spherical rolling bodies 4. The outer lateral surface 3d and a first end face 3b of the two end faces 3b, 3c of the outer ring 3 are surrounded by a sleeve 5, which has four lugs 5a pointing away from the outer ring 3 and from the first end face 3b for forming the axial position retention of the first rolling bearing 1 in an installed position. The sleeve furthermore has a rim 5c. A cage 6 for guiding the rolling body 4 is furthermore present. Two seal arrangements 7a, 7b shield the cage 6 including the rolling bodies 4 from the environment and are arranged between the inner ring 2 and the outer ring 3 on both sides of the cage 6. The axis 11 refers to the axis of rotation of the first rolling bearing 1, with respect to which the lugs 5a are aligned at an angle of ca. 9°. The outer ring 3 is fixedly connected to the sleeve 5 via a press fit.

Figure 2:
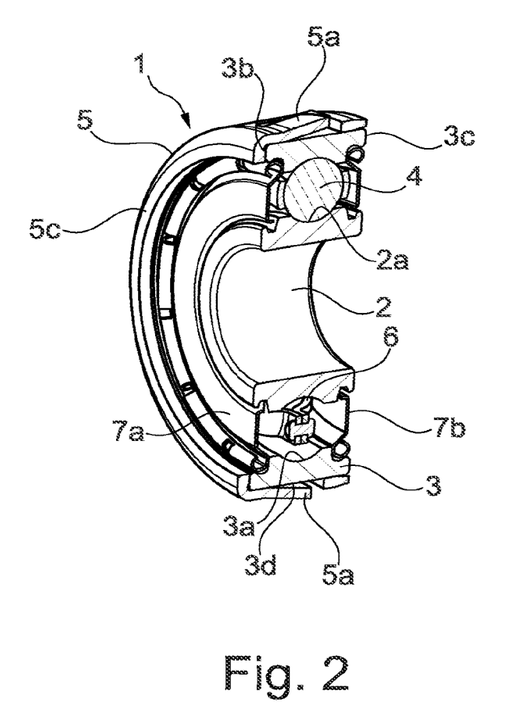
FIG. 2 a three-dimensional view of the longitudinal section through the first rolling bearing according to FIG. 1.

FIG. 2 shows a longitudinal section through the first rolling bearing 1 according to FIG. 1 in a three-dimensional view. Identical reference signs denote identical elements.

Figure 3:
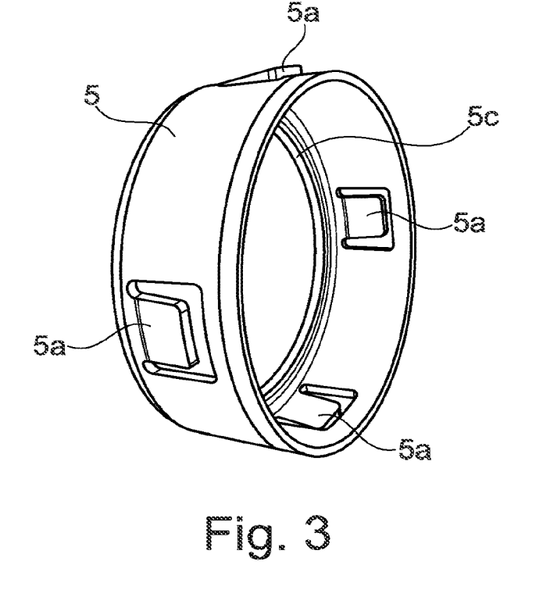
FIG. 3 a three-dimensional view of a sleeve with lugs of the first rolling bearing.

FIG. 3 shows a three-dimensional view of the sleeve 5 with the lugs 5a according to FIG. 1. Identical reference signs to those in FIGS. 1 and 2 denote identical elements. The lugs 5a are formed in one piece with the sleeve 5, wherein U-shaped material has been removed from the sleeve. The sleeve 5 is formed from steel by deep-drawing, wherein the lugs 5a have preferably been punched free by means of a punching procedure or milled out by means of a milling procedure after the deep-drawing procedure. The lugs 5a are then bent upwards out of the plane of the sleeve 5, wherein elastically resilient lugs 5a are produced when sides of the outside of the sleeve 5 are subjected to a load. The lugs 5a are at an angle to the axis 11 and protrude over the sleeve circumference. To this end, the lugs 5a are arranged such that they are pressed outwards from the sleeve plane in such a way that, in each case, a springy lug 5a remains with its lug end at a slight spacing from an external diameter of the sleeve 5.

Figure 4:
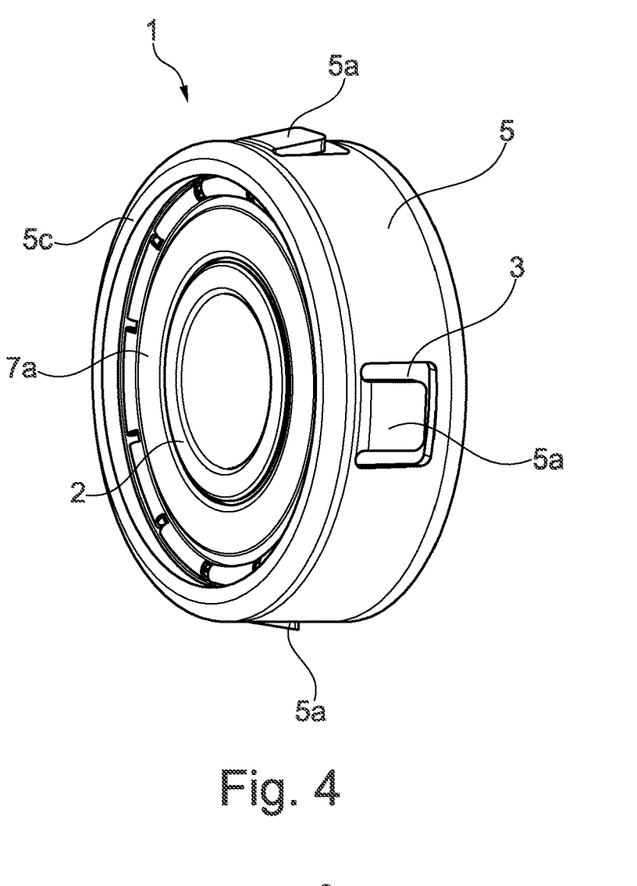
FIG. 4 a three-dimensional view of the first rolling bearing according to FIG. 1.

FIG. 4 shows a three-dimensional view of the first rolling bearing 1 according to FIGS. 1 and 2. Identical reference signs to those in FIGS. 1 and 2 denote identical elements.

Figure 5:
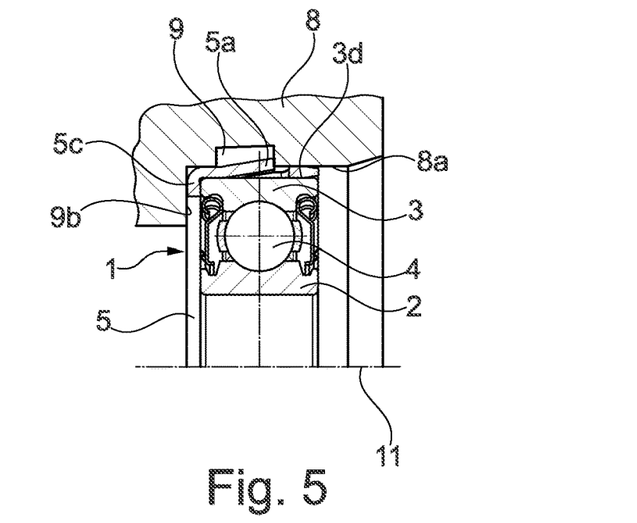
FIG. 5 a half longitudinal section through the first rolling bearing according to FIG. 1 in its installed situation in a housing.

FIG. 5 shows a half longitudinal section through the first rolling bearing 1 according to FIGS. 1, 2 and 4 in an installed situation in a housing 8 of a transmission. Identical reference signs to those in the previous figures denote identical elements. The housing 8 comprises a housing opening 8a for receiving the first rolling bearing 1 and an end stop 9b up to which the first rolling bearing 1 can be inserted into the housing opening 8a. A retaining contour 9 is provided in the housing opening 8a, by means of which the lugs 5a are latched within the housing opening 8a in the installed position of the first rolling bearing 1, wherein axial position retention of the first rolling bearing 1 in the housing 8 is provided on both sides. It is impossible for the first rolling bearing 1 to slip in the direction of the axis 11 owing to the end stop 9b on the one hand and the latching mechanism on the other.

Figure 6:
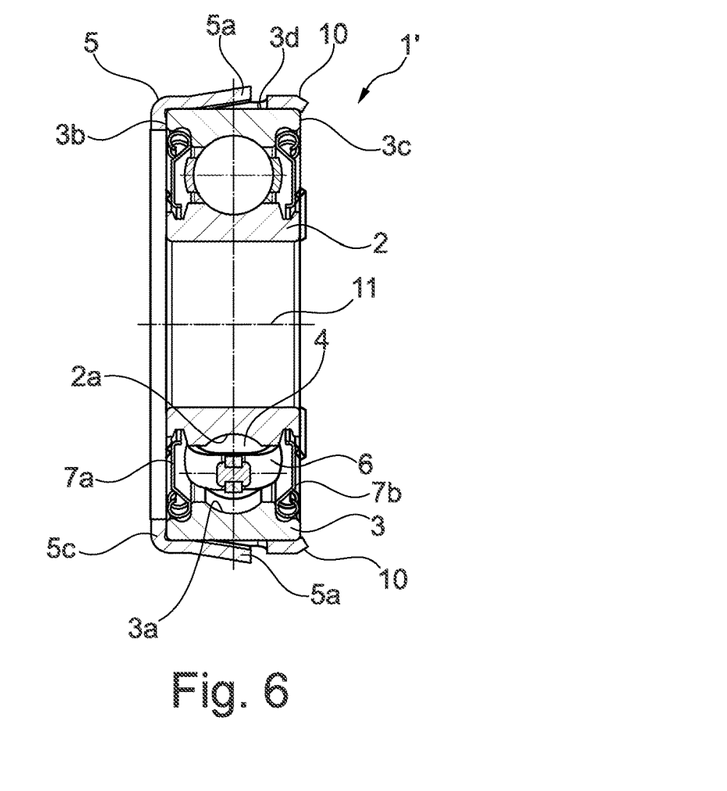
FIG. 6 a longitudinal section through a second rolling bearing according to the disclosure.

FIG. 6 shows a longitudinal section through a second rolling bearing 1' according to the disclosure in the form of a ball bearing. Identical reference signs to those in the previous figures denote identical elements. In contrast to the first rolling bearing 1, a press fit between the sleeve 5 and the outer ring 3 is not present here. Instead, the sleeve 5 is provided with embossments 10 in the region of the second end face 3c of the outer ring 3, which prevent the outer ring 3 from slipping out of the sleeve 5.

Figure 7:
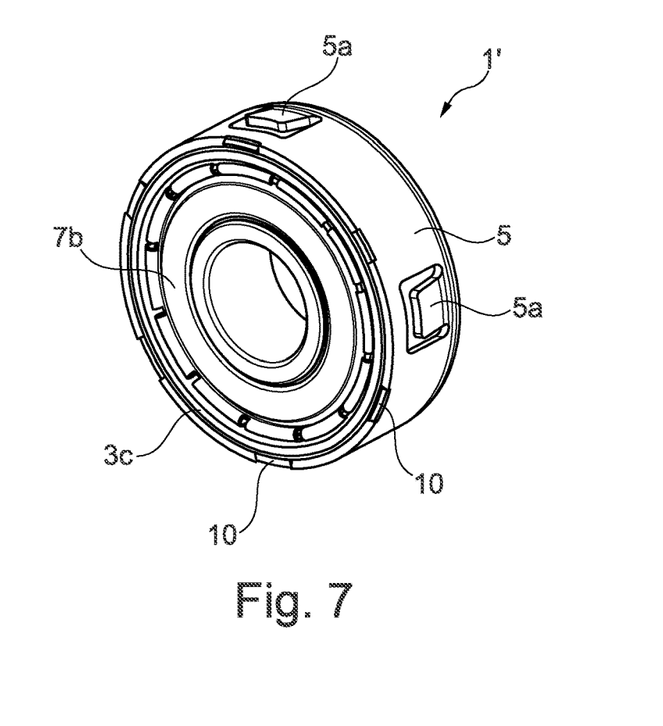
FIG. 7 a three-dimensional view of the second rolling bearing according to FIG. 6.

FIG. 7 shows a three-dimensional view of the second rolling bearing 1' according to FIG. 6. In this case, it can be seen that a total of six embossments 10 are present here, which are arranged in a uniform distribution over the circumference of the sleeve 5. However, more or fewer embossments 10 can be arranged depending on the application.

Figure 8:
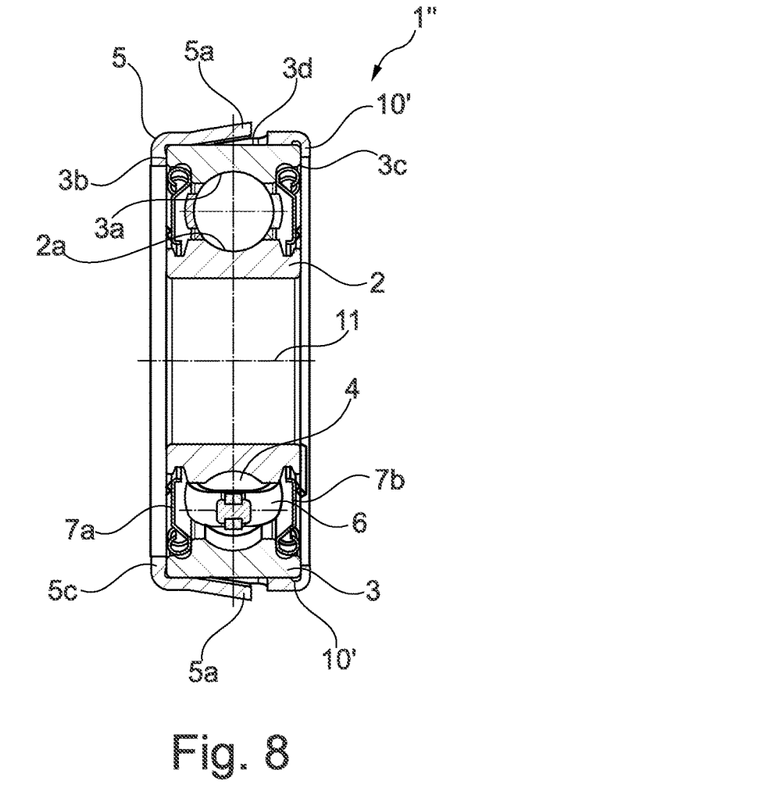
FIG. 8 a longitudinal section through a third rolling bearing according to the disclosure.

FIG. 8 shows a longitudinal section through a third rolling bearing 1" according to the disclosure in the form of a ball bearing. Identical reference signs to those in the previous figures denote identical elements. In contrast to the second rolling bearing 1', embossments 10 are not provided between the sleeve 5 and the outer ring 3 here. Instead, the sleeve 5 is provided with a flange rim 10' in the region of the second end face 3c of the outer ring 3, which flange rim prevents the outer ring 3 from slipping out of the sleeve 5. In this case, the thinner end of the sleeve 5, which protrudes over the second end face 3c of the outer ring 3, is flanged and the outer ring 3 is therefore positioned in an axially fixed manner in the sleeve 5.

Figure 9:
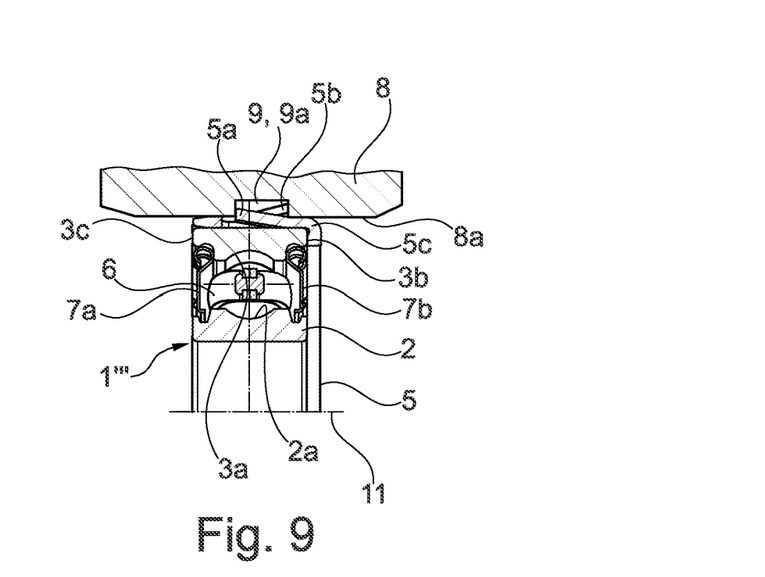
FIG. 9 a half longitudinal section through a fourth rolling bearing according to the disclosure in its installed situation in a housing.

FIG. 9 shows a half longitudinal section through a fourth rolling bearing 1'" according to the disclosure in the form of a ball bearing in an installed situation in a housing 8 of a transmission. Identical reference signs to those in the preceding figures denote identical elements. The housing 8 comprises the housing opening 8a for receiving the fourth rolling bearing 1'", wherein a retaining contour 9 is provided in the housing opening 8a, by means of which the lugs 5a are latched in the housing opening 8a in the installed position of the fourth rolling bearing 1'". In contrast to FIG. 5, an end stop 9b for the fourth rolling bearing 1'" is not provided in the housing opening 8a here. The sleeve 5 of the fourth rolling bearing 1'" has further lugs 5b which are aligned in opposite directions to the lugs 5a. The retaining contour 9, into which the lugs 5a are latched, is formed at the same time as a further retaining contour 9a here, by means of which the further lugs 5b are latched in the housing opening 8a in the installed position of the fourth rolling bearing 1'". Axial position retention of the fourth rolling bearing 1'" in the housing 8 is therefore provided via the lugs 5a and the further lugs 5b which are latched in the retaining contour 9, 9a and prevent a displacement of the fourth rolling bearing 1'" in the direction of the axis 11.

Figure 10:
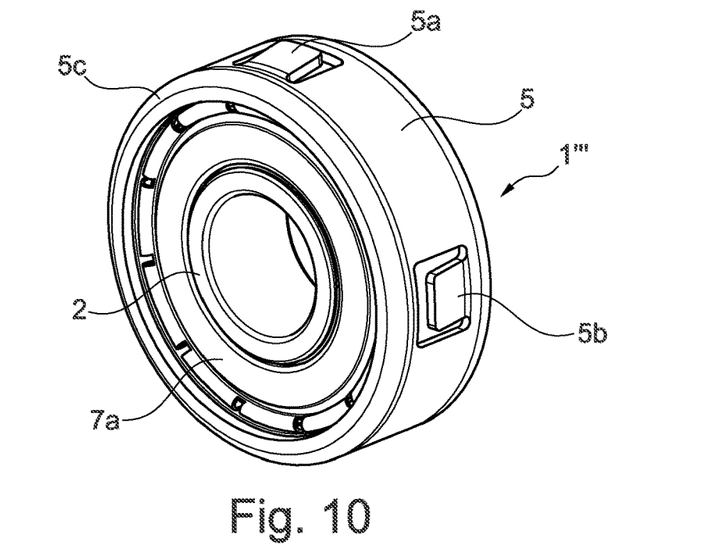
FIG. 10 the fourth rolling bearing according to FIG. 9 in a three-dimensional view.

FIG. 10 shows the fourth rolling bearing 1'" according to FIG. 9 in a three-dimensional view. Identical reference signs to those in FIG. 9 denote identical elements.

Figure 11:
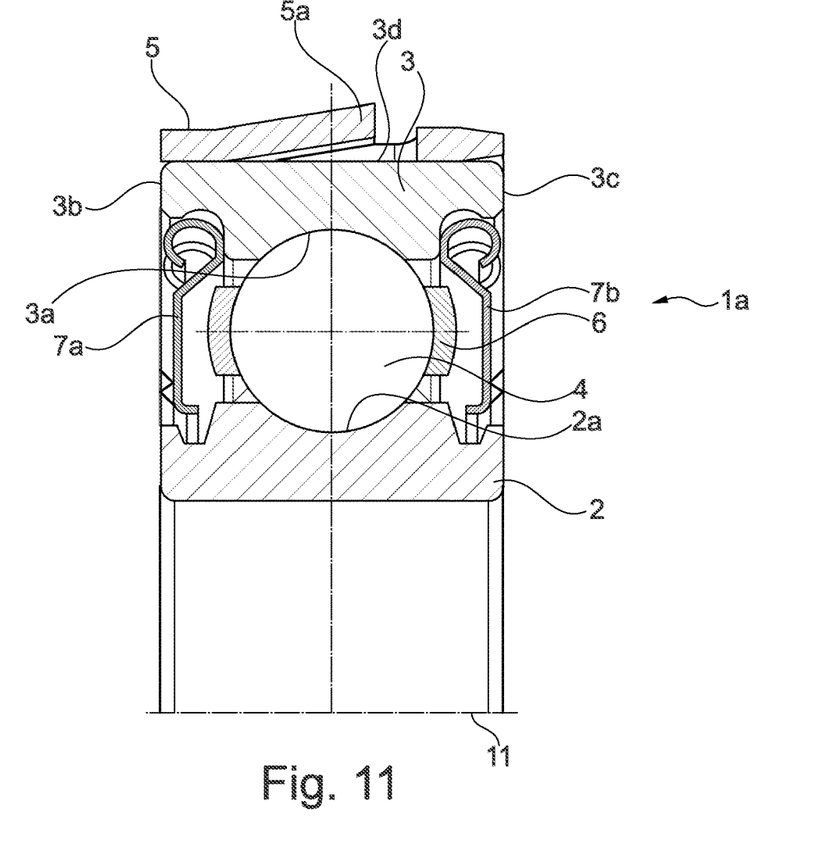
FIG. 11 a fifth rolling bearing according to the disclosure in a half longitudinal section.

FIG. 11 shows a fifth rolling bearing 1a according to the disclosure in a half longitudinal section. Identical reference numerals to those in the preceding figures denote identical elements. The sleeve 5 does not project over the outer ring 3 at either of its two end faces 3b, 3c here. In this case, a press fit between the sleeve 5 and the outer ring 3 is present to achieve a fastening of the sleeve 5 on the outer ring 3.

The rolling bearing and housing illustrated in FIGS. 1 to 11 are merely intended to demonstrate the disclosure by way of example. Therefore, instead of a ball bearing, a needle bearing or the like can also be present. Instead of a sleeve made from metal, a sleeve made from plastics material or a composite material can be used, for example. Furthermore, the number of lugs and further lugs is also variable and can be adapted to the application.

LIST OF REFERENCE SIGNS 1, 1', 1", 1'", 1a Rolling bearing
2 Inner ring
2a First raceway
3 Outer ring
3a Second raceway
3b First end face
3c Second end face
3d Outer lateral surface
4 Rolling body
5 Sleeve
5a Lug
5b Further lug
5c Rim
6 Cage
7a, 7b Seal arrangement
8 Housing
8a Housing opening
9, 9a Retaining contour 9b End stop
10 Embossment
10' Flange rim
11 Axis

The invention claimed is:

1. A rolling bearing, comprising:
an inner ring having a first raceway,
an outer ring having a second raceway, two end faces, and an outer lateral surface,
a plurality of rolling bodies; and
a sleeve surrounding the outer lateral surface of the outer ring, the sleeve having at least one lug, pointing away from the outer ring and a first end face of the two end faces, and at least one further lug, pointing away from the outer ring and from a second end face opposite the first end face, for axially retaining the rolling bearing in an installed position.

2. The rolling bearing as claimed in claim 1, further comprising a cage for guiding the rolling bodies.

3. The rolling bearing as claimed in claim 1, further comprising at least one seal arrangement which is arranged in a region between the inner ring and the outer ring.

4. The rolling bearing as claimed in claim 1, wherein at least three lugs are present.

5. The rolling bearing as claimed in claim 1, wherein the sleeve does not project over at least one of the two end faces of the outer ring.

6. The rolling bearing as claimed in claim 1, wherein the plurality of rolling elements are balls.

7. A transmission, comprising:
at least one rolling bearing as claimed in claim 1; and
a housing having a housing opening receiving the at least one rolling bearing, wherein at least one retaining contour is provided in the housing opening, by which the at least one lug is latched in the housing opening to axially retain the at least one roll bearing in the installed position.

8. The transmission as claimed in claim 7, wherein the at least one housing opening has an end stop for the rolling bearing, up to which the rolling bearing is inserted into the housing opening.

9. The transmission as claimed in claim 7, wherein at least one further retaining contour is provided in the housing opening, by which the at least one further lug is latched in the housing opening in the installed position of the rolling bearing.

* * * * *